(12) United States Patent
Lewis et al.

(10) Patent No.: US 7,894,378 B2
(45) Date of Patent: Feb. 22, 2011

(54) METHOD FOR UPDATING A MULTICAST STATE OF A MULTICAST GROUP

(75) Inventors: Adam C. Lewis, Buffalo Grove, IL (US); Surong Zeng, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 769 days.

(21) Appl. No.: 11/839,735

(22) Filed: Aug. 16, 2007

(65) Prior Publication Data

US 2009/0046614 A1 Feb. 19, 2009

(51) Int. Cl.
*H04J 3/24* (2006.01)
(52) U.S. Cl. .................................... 370/312; 370/349
(58) Field of Classification Search ............... 370/310.2, 370/312, 328, 230, 338, 349
See application file for complete search history.

(56) References Cited

U.S. PATENT DOCUMENTS

| 7,251,238 | B2 | 7/2007 | Joshi et al. | |
|---|---|---|---|---|
| 2001/0034793 | A1 | 10/2001 | Madryga et al. | |
| 2006/0050659 | A1* | 3/2006 | Corson et al. | 370/310 |
| 2006/0072532 | A1* | 4/2006 | Dorenbosch et al. | 370/342 |
| 2006/0098607 | A1 | 5/2006 | Zeng et al. | |
| 2006/0209774 | A1* | 9/2006 | Mori | 370/338 |
| 2007/0168555 | A1* | 7/2007 | Dorenbosch | 709/245 |

OTHER PUBLICATIONS

"Multicast Operation of the Ad-Hoc On-Demand Distance Vector Routing Protocol" by E. M. Royer and C. E. Perkins; Mobicom 1999, Aug. 1999—12pp.
"On-Demand Multicast Routing Protocol in Multihop Wireless Mobile Networks" by S. Lee, W. Su and M. Gerla; Mobile Networks and Applications, vol. 7, Issue 6, Dec. 2002—16pp.
RFC 3376, "Internet Group Management Protocol, Version 3" by B. Cain, S. Deering, I. Kouvelas, B. Fenner, and A. Thyagarajan, Oct. 2002—53pp.

* cited by examiner

*Primary Examiner*—Brenda Pham
(74) *Attorney, Agent, or Firm*—Randi L. Karpinia (57) ABSTRACT

A method and system for updating a multicast state of a multicast group at a first mesh access point as provided improves network efficiency. According to one aspect, the method includes processing a multicast member join request for the multicast group received from a first wireless node. A proxy update message for the first wireless node received from a third mesh access point is then processed. The first wireless node connects to a second mesh access point after joining the multicast group via the first mesh access point, and the third mesh access point is a root node of a mesh tree of which the second mesh access point is a node. An Internet Group Management Protocol (IGMP) query message for the multicast group is then generated. A multicast update (MUPD) packet is then transmitted to an upstream node, whereby a multicast state is updated at the upstream node.

13 Claims, 5 Drawing Sheets

METHOD FOR UPDATING A MULTICAST STATE OF A MULTICAST GROUP

FIELD OF THE INVENTION

The present invention relates generally to multicasting messages in a communications network, and in particular to multicasting messages in a mesh network by updating a multicast state of a multicast group.

BACKGROUND

Mesh network technology enables wireless devices (also referred to as nodes or stations) to communicate with peers either directly or by relaying network data packets through a series of wireless intermediate nodes. The intermediate nodes can be fixed elements of a network infrastructure, or mobile wireless stations that are capable of routing or relaying data packets between neighboring network nodes. A gateway or a bridge between a mesh network and a non-mesh network, such as a backbone network, is called a mesh gateway or an Intelligent Access Point (IAP). A wireless intermediate node, also referred to as a wireless router or a mesh access point, can act as a router, a bridge, or a repeater to relay data packets between neighboring network nodes that are in communication with the wireless intermediate node. Thus, mesh access points can extend a communication range of an IAP by relaying data packets between neighboring network nodes.

A mesh network can comprise one or more mesh gateways or mesh access points. The mesh gateways and mesh access points can provide wireless mesh networking by establishing wireless backhaul connections, also referred to as wireless distribution systems (WDSs). This type of mesh networking is referred to as wireless backhaul meshing or infrastructure meshing. Alternatively, a mesh network can comprise mobile wireless stations that act as intermediate nodes relaying data between nearby mobile stations. This type of mesh networking is referred to as client meshing or ad-hoc networking. Also, a combination of both types of mesh networking can be used.

Large scale wireless mesh networks utilizing low-powered, short-range, high data rate communication devices can thus provide long range wireless networking. Advantages of such wireless mesh networks include low interference and large scale wireless coverage with significantly less infrastructure than a cellular network. For example, wireless mesh networks can provide ubiquitous Internet access if a mesh gateway participating in the mesh network is connected the Internet.

Multicasting is an efficient method for supporting group communications in a communications network. It allows transmission and routing of packets from one or more sources to multiple destinations simultaneously. Common multicast applications include net meetings and multimedia group sharing, such as group video sharing. Providing network services, such as multicasting services, in a mesh network can be more challenging than providing network services in a wired network, because a mesh network may dynamically reconfigure itself in response to moving wireless nodes within the network. For example, wireless mobile stations can roam around a mesh network, thereby requiring the establishment of various new routing paths in the mesh network. Detrimentally, if a mobile station joined a multicasting group via a first mesh access point in a mesh network in order to receive a multicast data stream, such as a video data stream, but then transferred its communication connection from the first mesh access point to a second mesh access point, the multicast data stream would continue to be forwarded to the first mesh access point, even if the first mesh access point no longer had any members receiving the multicast data stream.

Various multicast algorithms for wireless mesh networks have been proposed. Examples include Multicast Ad-hoc On-demand Distance Vector (MAODV) algorithms as described in "Multicast Operation of the Ad-Hoc On-Demand Distance Vector Routing Protocol", MobiCom'99, August 1999, by E. M. Royer and C. E. Perkins; On-Demand Multicast Routing Protocol (ODMRP) algorithms as described in "On-Demand Multicast Routing Protocol in Multihop Wireless Mobile Networks", Mobile Networks and Applications, Volume 7, Issue 6, December 2002, by S. Lee, W. Su and M. Gerla; and Core Assisted Mesh Protocol (CAMP) algorithms as described in United States Patent Application Publication No. US 2001/0034793 A1, to Madruga et al, titled "Core Assisted Mesh Protocol for Multicast Routing in Ad-Hoc Networks", published on Oct. 25, 2001, all herein incorporated by reference in their entirety. However, existing membership management protocols, such as the Internet Group Management Protocol (IGMP) as specified in Internet standards RFC 3376, "Internet Group Management Protocol, Version 3", by B. Cain, S. Deering, I. Kouvelas, B. Fenner, and A. Thyagarajan, October 2002, herein incorporated by reference in its entirety, are not suitable for managing frequent membership changes in a mesh network. Thus valuable network resources are often wasted on transmitting multicast network traffic to network segments that are not presently connected to any multicast group members.

BRIEF DESCRIPTION OF THE FIGURES

In order that the invention may be readily understood and put into practical effect, reference will now be made to example embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to updating a multicast state of a multicast group. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of updating a multicast state of a multicast group as described herein. The non-processor circuits may include, but are not limited to, a radio receiver, a radio transmitter, signal drivers, clock circuits, power source circuits, network interface circuits, and user input devices. As such, these functions may be interpreted as steps of a method for updating a multicast state of a multicast group. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Any embodiment described herein is not necessarily to be construed as preferred or advantageous over other embodiments. All of the embodiments described in this Detailed Description are illustrative, and provided to enable persons skilled in the art to make or use the invention and not to limit the scope of the invention which is defined by the claims.

Some embodiments of the present invention define a method for updating a multicast state of a multicast group at a first mesh access point. The method includes processing a multicast member join request for the multicast group received from a first wireless node. For example, consider that the first wireless node is a mobile wireless station such as a mobile telephone that is moving in a vehicle away from the first mesh access point while receiving a multicast data stream from the multicast group. The first wireless node thus connects to a second mesh access point to establish a better wireless communication link. A proxy update message for the first wireless node is then received from a third mesh access point and is processed, so that the first mesh access point no longer needs to act as a proxy for the first wireless node. The third mesh access point can be a root node of a mesh tree of which the second mesh access point is a node. That means that the first mesh access point does not need to forward the multicast data stream to the first wireless node. An Internet Group Management Protocol (IGMP) query message is then generated for the multicast group in response to processing the proxy update message. A multicast update (MUPD) packet is then transmitted to an upstream node in response to determining that an IGMP report for the IGMP query message has not been received from any nodes associated with the first mesh access point. Thus a multicast state can be updated at the upstream node.

Advantages of some embodiments of the present invention therefore include enabling prompt updating of a multicast state of a multicast group when routing paths of mobile multicast group members change. For example, mobile telephone users in a metropolitan area can continue receiving multicast data streams from a multicast group while freely moving around the metropolitan area and roaming across multiple mesh access points in a mesh network. A multicast state of the multicast group can be promptly updated to redirect the multicast data streams to the users and avoid occurrences where unnecessary multicast network traffic is forwarded to old mesh access points, to which the mobile phone users are no longer connected. Overall network resources therefore can be conserved.

A mesh network can comprise one or more of mesh gateways, wireless mesh access points, and wireless nodes. A mesh gateway routes network traffic between a mesh network and a backbone network. Mesh access points mainly participate in routing network traffic between neighboring nodes in a mesh network. Wireless nodes, also referred to as wireless stations, such as mobile telephones or two-way radios, are consumers or producers of network traffic.

Figure 1:
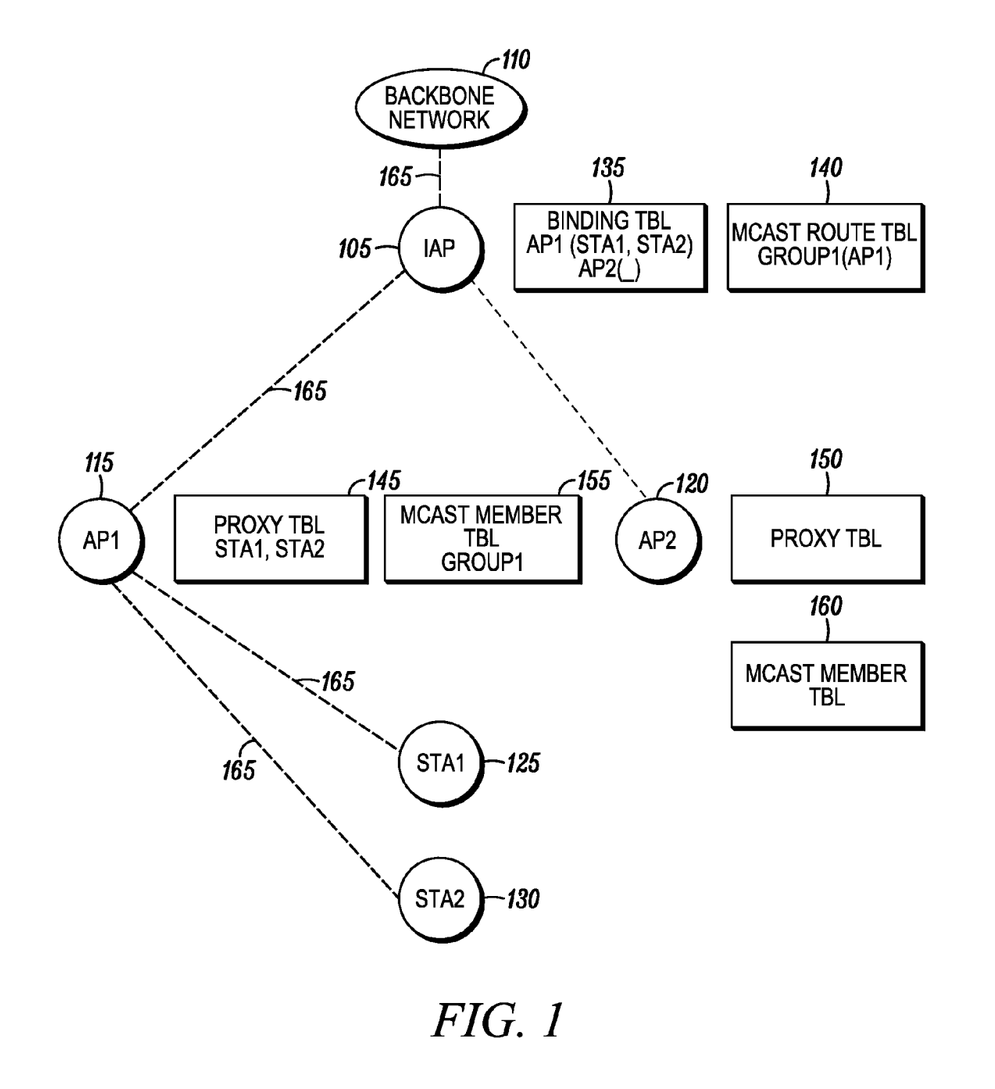
FIG. 1 is a block diagram illustrating a multicast state of a multicast group in a mesh network, according to some embodiments of the present invention.

Referring to FIG. 1, a block diagram illustrates a multicast state of a multicast group in a mesh network 100, according to some embodiments of the present invention. The mesh network 100 comprises an intelligent access point (IAP) 105, which has a wired link with a backbone network 110 and wireless links with a first mesh access point 115 and a second mesh access point 120. Each mesh access point 115, 120 typically provides one or more sources of audio, video and/or data information. The first mesh access point 115 may be, for example, an Institute of Electrical and Electronics Engineers (IEEE) 802.11 access point, an IEEE 802.16 base station, or a cellular base station or other wireless access point. Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA.

The IAP 105 is a mesh gateway that routes network traffic between the backbone network 110 and the mesh network 100. The first mesh access point 115 has wireless links with a first wireless node 125 and a second wireless node 130, and routes network traffic between the IAP 105 and the wireless nodes 125, 130.

In order to route various types of network traffic in the mesh network 100, intermediate nodes, such as the IAP 105 and the mesh access points 115, 120, maintain one or more routing tables. Routing information in the routing tables can reflect a particular arrangement of the mesh network 100. For instance, the IAP 105 has a binding table 135 and a multicast routing table 140. The binding table 135 describes logical links between nodes in the network 100. The multicast routing table 140 includes information used to determine where a node routes packets. The first mesh access point 115 and the second mesh access point 120 also maintain proxy tables 145, 150, respectively, and multicast member tables 155, 160, respectively. The proxy tables 145, 150 identify non-routable devices and routable devices which proxy for those non-routable devices in the mesh network 100. The binding table 135 and the proxy tables 145, 150 can be used for routing unicast data packets. The multicast routing table 140 and the multicast member tables 155, 160 can be used for routing multicast data streams.

FIG. 1 illustrates that the first wireless node 125 and the second wireless node 130 have joined the mesh network 100 via the first mesh access point 115. Information concerning members of the mesh network 100 is described in the binding table 135 and the proxy table 145. The binding table 135 contains an entry for the first mesh access point 115, and the entry lists the first wireless node 125 and the second wireless node 130, so that network traffic for the wireless nodes 125, 130 can be forwarded to the first mesh access point 115, which is acting as a proxy for the wireless nodes 125, 130. The proxy table 145 also lists the first wireless node 125 and the second wireless node 130 so that the first mesh access point 115 can forward network traffic received from the IAP 105 to the wireless nodes 125, 130.

Consider that the first wireless node 125 and the second wireless node 130 have joined a multicast group, called "Group1," via the first mesh access point 115. Information concerning Group1 is described in the multicast routing table 140 and in the multicast member table 155. The IAP 105, acting as a local leader of the multicast group, maintains multicast routing information for the multicast group. A multicast routing table is therefore used to manage the multicast routing information. For example, the multicast routing table 140 has an entry for "Group1" and the entry lists the first mesh access point 115. That is because the first mesh access point 115 is a next hop towards the wireless nodes 125, 130, which are members of the multicast group.

The first mesh access point 115, acting as a proxy for the wireless nodes 125, 130, maintains multicast group information of the multicast group. The multicast group information can comprise a list of addresses of multicast members associated with the first mesh access point 115. A multicast member table can be used to manage the multicast group information. For example, the multicast member table 155 contains an entry for "Group1". Thus, the IAP 105 can forward a multicast stream 165 received via the backbone network 110 to the first mesh access point 115. The first mesh access point 115 then can forward the multicast stream 165 to the first wireless node 125 and the second wireless node 130.

Figure 2:
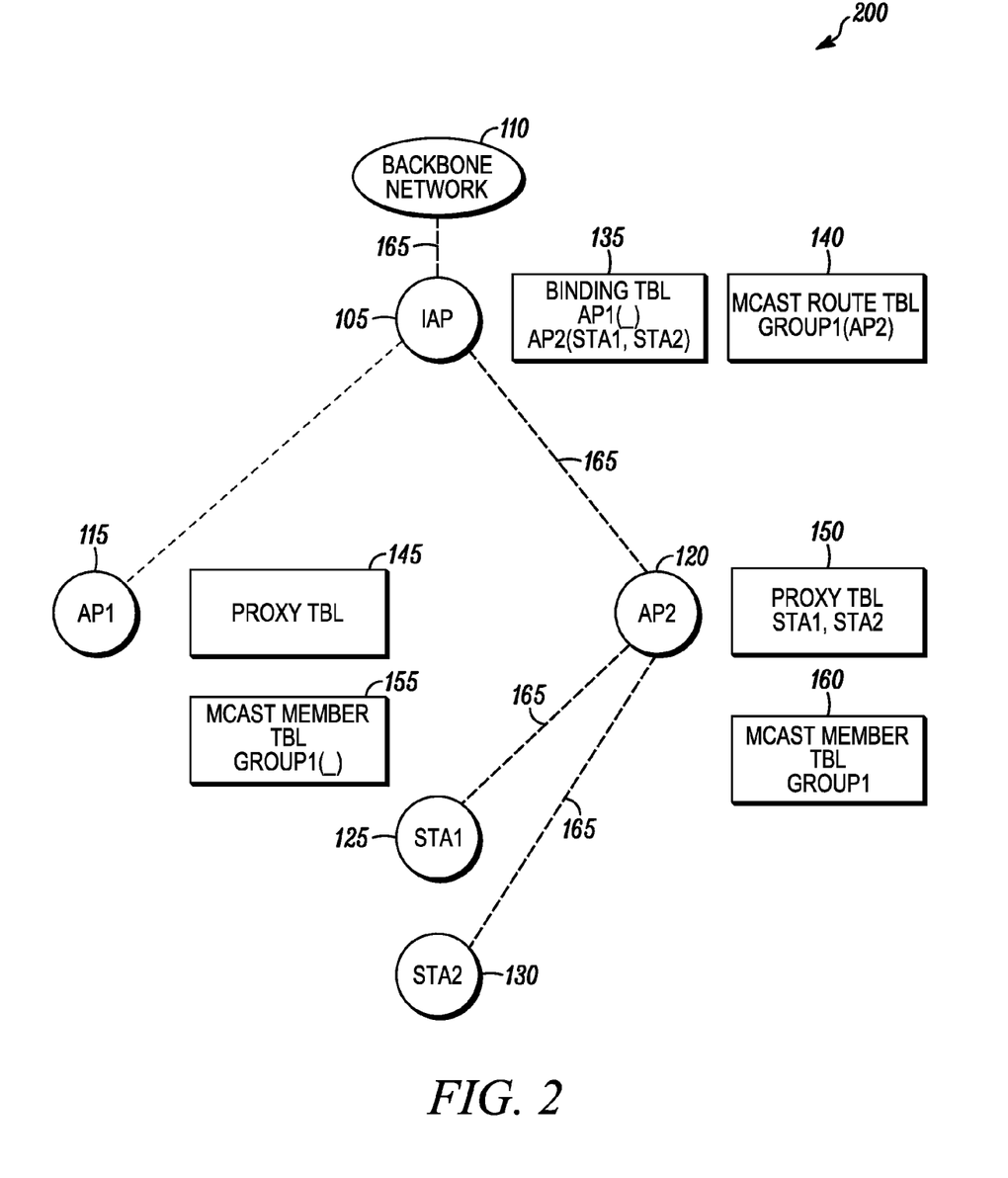
FIG. 2 is a block diagram illustrating an updated multicast state of a multicast group in a mesh network, according to some embodiments of the present invention.

Referring to FIG. 2, a block diagram illustrates an updated multicast state of a multicast group in a mesh network 200, according to some embodiments of the present invention. The mesh network 200 is a result of a reconfiguration of the mesh network 100, resulting when the first wireless node 125 and the second wireless node 130 move away from the first mesh access point 115 and thus are connected to the second mesh access point 120 and establish new route paths. For example, the second mesh access point 120 can send a binding request (BREQ) message for the wireless nodes 125, 130 to the IAP 105 in order to instruct the IAP 105 to forward network traffic, which are destined to the wireless nodes 125, 130, to the second mesh access point 120. The IAP 105 then can use information provided in the BREQ message to update the binding table 135. For example, descriptions of the wireless nodes 125, 130 can be removed from an entry for the first mesh access point 115 in the binding table 135, and the descriptions of the wireless nodes 125, 130 can be added to an entry for the second mesh access point 120. The BREQ message can additionally include information about the multicast group, of which members are associated with the second mesh access point 120.

Further, on behalf of each wireless node 125, 130, the second mesh access point 120 can send a routing request (RREQ) message to the IAP 105 to join the multicast group. The IAP 105 then can use information in the RREQ message to update multicast routing information of the multicast group. For example, the RREQ message can include a multicast group address of the group that the wireless nodes 125, 130 are joining, and a description of the second mesh access point 120 can be added to the multicast routing table 140.

A BREQ is described in U.S. Pat. No. 7,251,238, titled "System and Method for Routing Data Between Different Types of Nodes in a Wireless Network", by Joshi, et al., issued Jul. 31, 2007, and herein incorporated by reference in its entirety. For example, a BREQ may include the following information: a Bound Intelligent Access Point (IAP) Address (such as a Medium Access Control (MAC) address, Internet Protocol (IP) address or other device identification (ID); an Originator MAC Address (such as an address of an access point or other meshed device, which address may be a MAC address, IP address or other device ID); and a List of Devices associated with an originator meshed device; and an Old Bound IAP MAC Address (such as a MAC address, IP address or other device ID.

When the IAP 105 receives the BREQ message from the second mesh access point 120, the IAP 105 sends a proxy update message, such as a proxy removal (PREM) message, to the first mesh access point 115. The PREM message indicates that the first mesh access point 115 can stop being a proxy for the wireless nodes 125, 130.

The reception of a PREM message also triggers the first mesh access point 115 to generate an Internet Group Management Protocol (IGMP) query message for the multicast group. The IGMP query message is thus generated, or spoofed, on behalf of an IGMP server. In this context, spoofed means network elements are fooled because the IGMP query message was not actually transmitted by an IGMP server. Since the second wireless node 130 is also connected to the second mesh access point 120, no IGMP reports will be received from the second wireless node 130. Thus the first mesh access point 115 can update the multicast state in response determining that no IGMP reports are received from the second wireless node 130, or any other node, within a certain time limit. For example, the update can include removing a description of the multicast group, of which the first wireless node 125 and the second wireless node 130 are members, from the multicast member table 155.

Also, a multicast update (MUPD) packet can be transmitted to an upstream node in response to determining that an IGMP report in response to the IGMP query message has not been received from any nodes associated with the first mesh access point 115. For example, there will be no IGMP reports from the first wireless node 125 or the second wireless node 130, which had previously joined the multicast group via the first mesh access point 115. Thus, the first mesh access point 115 can send an MUPD packet to the IAP 105 to instruct that a multicast tree branch comprising the first mesh access point 115 no longer includes any multicast members of the multicast group. A multicast tree branch includes one or more multicast tree routes extending from a point in a network. The IAP 105 then can remove a description of the multicast tree branch from multicast routing information of the multicast group. Thus, as shown in FIG. 2, an identification and a description of the first mesh access point 115 is removed from the multicast routing table 140.

Figure 3:
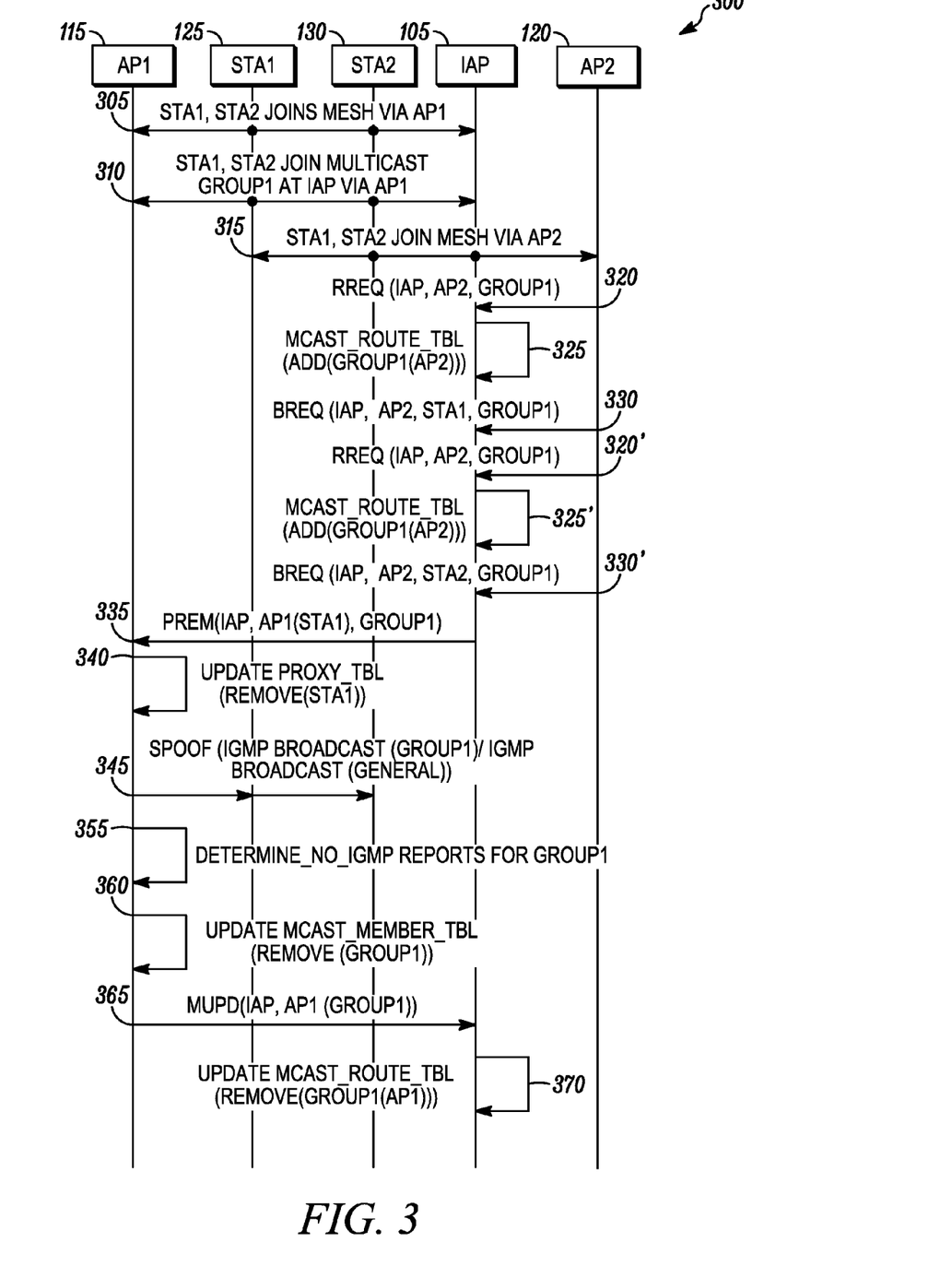
FIG. 3 is a sequence diagram illustrating a method for updating a multicast state of a multicast group at a first mesh access point, according to some embodiments of the present invention.

Referring to FIG. 3, a sequence diagram illustrates a method 300 for updating a multicast state of a multicast group at a first mesh access point, according to some embodiments of the present invention. At step 305, the first wireless node 125 and the second wireless node 130 join the mesh network 100 via the first mesh access point 115. At step 310, the first wireless node 125 and the second wireless node 130 join a multicast group, called "Group1", via the first mesh access point 115. For example, the first wireless node 125 and the second wireless node 130 can send an Internet Group Management Protocol (IGMP) member join request to the network to join the multicast group, and their associated mesh access point (MAP) 115 inspects the IGMP join report. The MAP 115 then sends a routing request (RREQ) to the IAP 105 in order to form a multicast tree. One example of a method for forming such a multicast tree is described in United States Patent Publication No. US 2006/0098607, to Zeng et al., titled "System and Method to Support Multicast Routing in Large Scale Wireless Mesh Networks", published on May 11, 2006, herein incorporated by reference in its entirety. At step 315, the first wireless node 125 and the second wireless node 130 then connect to the second mesh access point 120.

At step 320, the second mesh access point 120 sends a routing request (RREQ) message to the IAP 105 for the first wireless node 125 requesting to join the multicast group. At step 325, the IAP 105 then adds a description of the second mesh access point 120 to the multicast routing table 140 in response to processing the RREQ message received from the second mesh access point 120.

At step 330, the second mesh access point 120 sends a binding request (BREQ) message to the IAP 105 to initiate the set up of a new routing path for the first wireless node 125. The BREQ message can include descriptions of the first wireless node 125 and the second mesh access point 120, which is a new proxy of the first wireless node 125. The BREQ message can also include multicast group member information for multicast members associated with the second mesh access point 120. For example, the BREQ message can include information of "Group1" when the second mesh access point 120 discovers that the first wireless node 125 has previously joined the multicast group (i.e., "Group1") before connecting to the second mesh access point 120. As will be understood by those skilled in the art, steps 320', 325', 330', which correspond to the steps 320, 325, 330, are then performed for the second wireless node 130.

At step 335, the first mesh access point 115 processes a proxy removal (PREM) message received from the IAP 105. The PREM message can contain an address of the IAP 105, an address of the first mesh access point 115, and an address of the first wireless node 125. Also, the PREM message may contain the group addresses which are associated with the second mesh access point 120.

At step 340, the first mesh access point 115 then updates the proxy table 145 in response to processing the PREM message. The PREM message can also include multicast group member information for multicast members associated with the second mesh access point 120. For example, the PREM message can include a description of the "Group1", of which members are associated with the second mesh access point 120.

At step 345, the first mesh access point 115 broadcasts an IGMP group specific query message for the multicast group. Alternatively, if the PREM message from step 335 did not include group information, the first mesh access point 115 may broadcast an IGMP general query that does not include specific group information. At step 355, the first mesh access point 115 then determines that no IGMP reports have been received. At step 360, the multicast state of the multicast group is then updated by removing the multicast group entry from the multicast membership table in response to determining that an IGMP report for the IGMP query message has not been received from the second wireless node 130 or any other nodes associated with the first mesh access point 115.

At step 365, a multicast update (MUPD) packet is transmitted to the IAP 105 in response to determining that an IGMP report for the IGMP query message has not been received from any nodes associated with the first mesh access point 115. At step 370, the IAP 105 therefore removes a description of the first mesh access point 115 from the multicast routing table 140.

Figure 4:
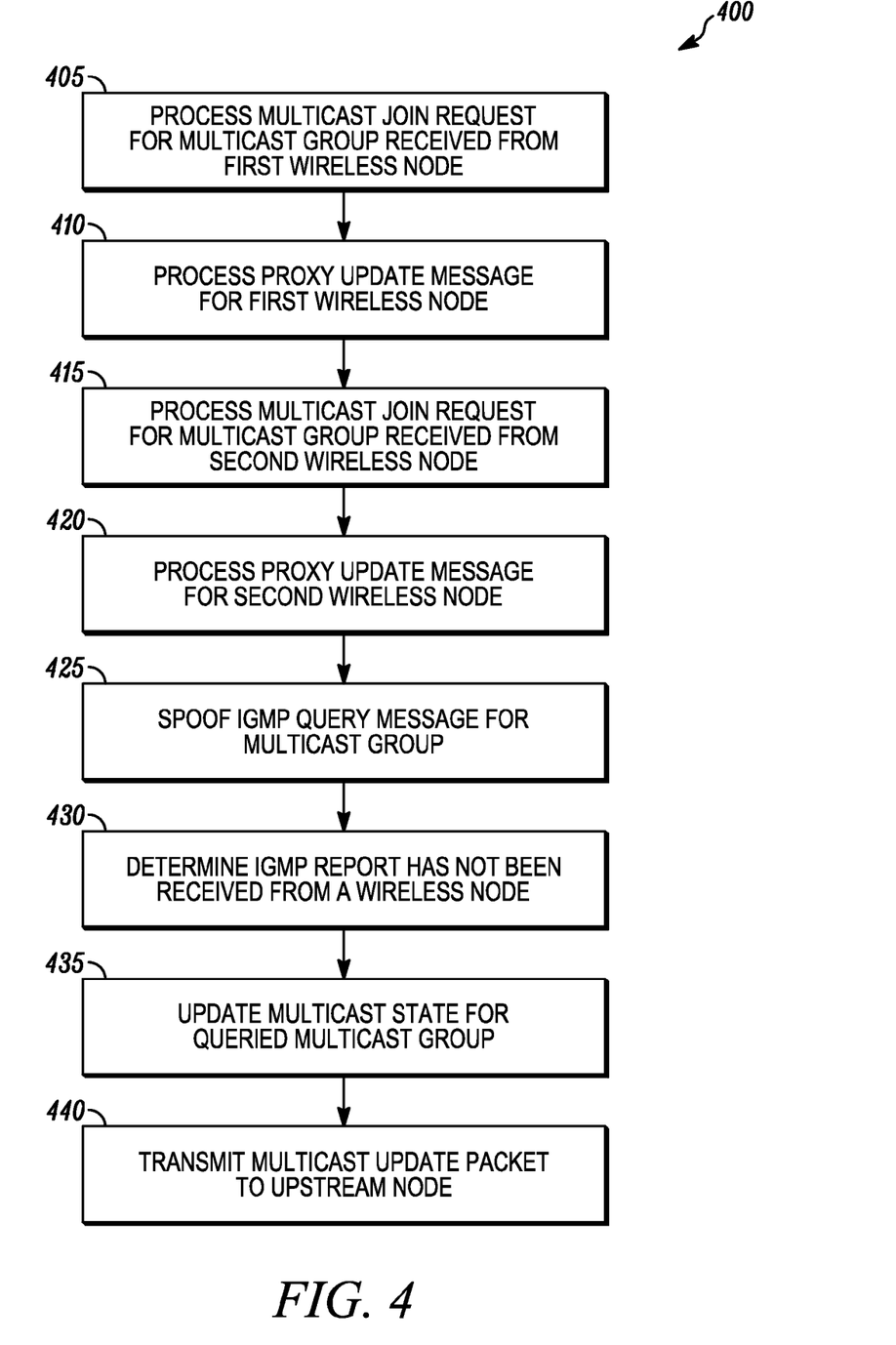
FIG. 4 is a general flow diagram illustrating a method for updating a multicast state of a multicast group at a first mesh access point, according to some embodiments of the present invention.

Referring to FIG. 4, a general flow diagram illustrates a method 400 for updating a multicast state of a multicast group at a first mesh access point, according to some embodiments of the present invention. At step 405, a multicast member join request is received from a first wireless node of the multicast group and is processed. After joining the multicast group via the first mesh access point, the first wireless node then communicatively connects to a second mesh access point. For example, as described above, the first wireless node 125 joins the multicast group in the IAP 105 via the first mesh access point 115, but then, as the first wireless node 125 moves away from the first mesh access point 115, the first wireless node 125 connects to the second mesh access point 120 to establish new routing paths.

At step 410, a proxy update message for the first wireless node received from a third mesh access point is processed. The third mesh access point is a root node of a mesh tree, of which the second mesh access point is a node. For example, the IAP 105 is a root node of a mesh tree, of which the second mesh access point 120 is a node. The IAP 105 sends a PREM message to the first mesh access point 115 in response to receiving a BREQ message from the second mesh access point 120.

At step 415, a multicast member join request is received from a second wireless node of the multicast group and is processed. Then, at step 420, a proxy update message for the second wireless node is processed. For example, when the first mesh access point 115 receives the PREM message, it updates the proxy table 145 to remove the first wireless node 125 from the proxy table 145. At step 425, an Internet Group Management Protocol (IGMP) query message is generated, or spoofed, for the multicast group in response to processing the proxy update message. For example, the first mesh access point 115 can generate an IGMP query message broadcast from the IAP 105.

At step 430, the first mesh access point determines that an IGMP report for the IGMP query message has not been received from a wireless node. For example, the first mesh access point 115 can determine that an IGMP report has not been received from the second wireless node 130 or any other node within a certain time limit.

At step 435, the multicast state of the multicast group is updated in response to determining that an IGMP report for the IGMP query message has not been received from any node. For example, the first mesh access point 115 can remove a description of the multicast group from the multicast member table 155 in response to determining that an IGMP report for the IGMP query message has not been received from a wireless node.

At step 440, a multicast update (MUPD) packet is transmitted to an upstream node in response to determining that an IGMP report for the IGMP query message has not been received from any nodes associated with the first mesh access point, whereby a multicast state is updated at the upstream node. For example, the first mesh access point 115 transmits an MUPD packet to the IAP 105 in response to determining that an IGMP report for the IGMP query message has not been received from the first wireless node 125 or the second wireless node 130. The IAP 105 then can remove a description of the first mesh access point 115 from the multicast routing table 140 in order to stop a multicast data stream of the multicast group being forwarded to the first mesh access point 115.

According to some embodiments of the present invention, the upstream node removes a description of a mesh multicast tree branch from multicast routing information of the multicast group, where the first mesh access point is a node of the mesh multicast tree branch. For example, in FIG. 1, a route path from the IAP 105 to the first mesh access point 115, and subsequent route paths from the first mesh access point 115 to the wireless nodes 125, 130, form a mesh multicast tree branch of the multicast group "Group1". The multicast routing table 140 contains information about the first mesh access point 115, which serves as information about the mesh multicast tree branch. However, in FIG. 2, the IAP 105 removes a description of the mesh multicast tree branch, by removing a description of the first mesh access point 115 from the multicast routing table 140 in response to receiving a MUPD packet from the first mesh access point 115.

According to further embodiments of the present invention, connections between the first mesh access point and the third mesh access point, and connections between the second mesh access point and the third mesh access point, comprise one or more of wireless connections or wired connections. For example, a connection between the first mesh access point 115 and the IAP 105, and a connection between the second mesh access point 120 and the IAP 105, comprise a wireless connection. However, the present invention is not limited to just direct, one hop wireless connections. For example, there can be one or more mesh access points between the first mesh access point 115 and the IAP 105, or between the second mesh access point 115 and the IAP 105. Furthermore, the first mesh access point and the second mesh access point can be connected to different IAPs.

Figure 5:
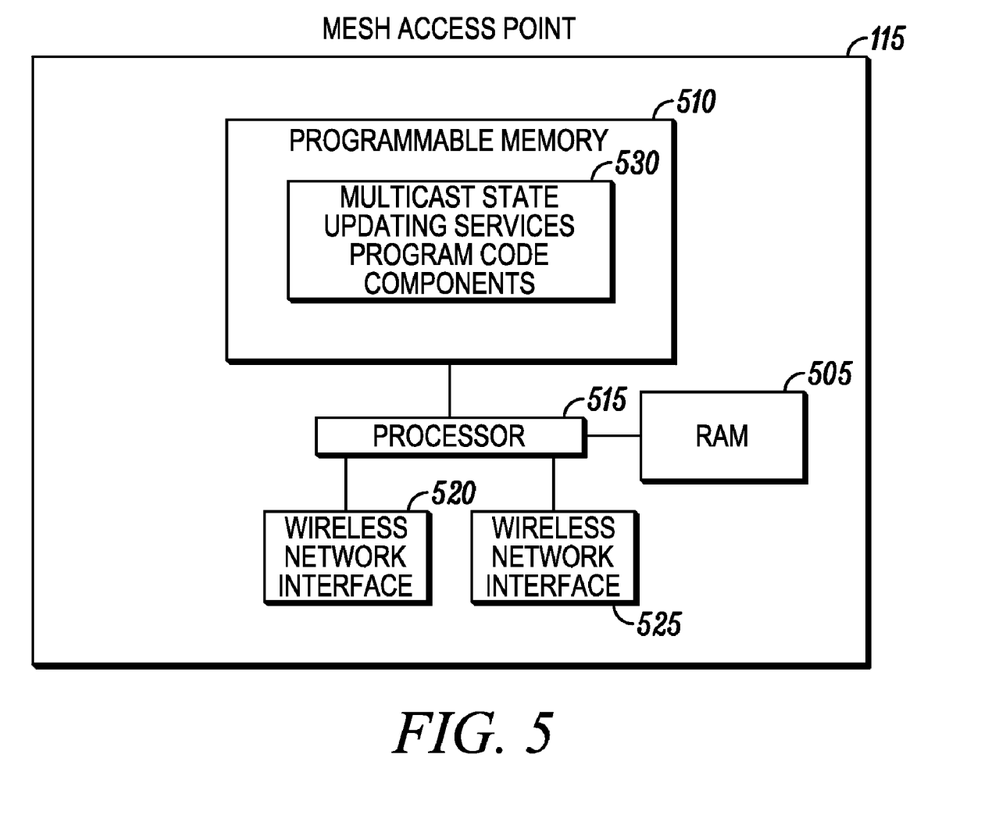
FIG. 5 is a block diagram illustrating components of a mesh access point, according to some embodiments of the present invention.

Referring to FIG. 5, a block diagram illustrates components of the first mesh access point 115, according to some embodiments of the present invention. The first mesh access point 115 comprises a random access memory (RAM) 505 and a programmable memory 510 that are coupled to a processor 515. The processor 515 also has ports for coupling to wireless network interfaces 520, 525. The wireless network interfaces 520, 525 can be used to enable the first mesh access point 115 to communicate with neighboring network nodes in the mesh network 100. For example, the first mesh access point 115 can communicate with the IAP 105, the first wireless node 125, and the second wireless node 130 using the wireless network interface 520 to receive and route data packets.

The programmable memory 510 can store operating code (OC) for the processor 515 and code for performing functions associated with a mesh access point. For example, the programmable memory 510 can comprise multicast state updating services computer readable program code components 530 configured to cause execution of a method for updating a multicast state of a multicast group as described herein.

Advantages of some embodiments of the present invention therefore include enabling prompt updating of a multicast state of a multicast group when a configuration of a mesh network changes. Mobile multicast group members, such as mobile telephones in moving vehicles, can continuously receive multicast data streams from a multicast group roaming across multiple mesh access points in a mesh network while the mesh network promptly updates multicast states of the multicast group. The multicast data streams thus can be promptly redirected so they are sent to only the mobile multicast group members. That can substantially reduce occurrences where the multicast data streams are forwarded to old mesh access points, to which the mobile multicast group members are no longer connected. Overall network resources therefore can be conserved.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims.

We claim:

1. A method for updating a multicast state of a multicast group, the method comprising:
   processing a multicast member join request for the multicast group received from a first wireless node;
   processing a proxy update message for the first wireless node received from a third mesh access point, wherein the first wireless node connects to a second mesh access point after joining the multicast group via a first mesh access point, and the third mesh access point is a root node of a mesh tree of which the second mesh access point is a node;
   generating an Internet Group Management Protocol (IGMP) query message for the multicast group in response to processing the proxy update message; and
   transmitting a multicast update (MUPD) packet to an upstream node in response to determining that an IGMP report for the IGMP query message has not been received from any nodes associated with the first mesh access point, whereby a multicast state is updated at the upstream node.

2. The method of claim 1, further comprising:
   determining that an IGMP report for the IGMP query message has not been received from a wireless node; and
   updating the multicast state of the multicast group in response to determining that an IGMP report for the IGMP query message has not been received from a wireless node.

3. The method of claim 2, wherein updating the multicast state of the multicast group includes removing a description of the multicast group of which the first and second wireless nodes are members from multicast group information in response to determining that an IGMP report for the IGMP query message has not been received from a wireless node.

4. The method of claim 2, wherein the upstream node is an Intelligent Access Point (IAP).

5. The method of claim 2, wherein the upstream node is the third mesh access point.

6. The method of claim 2, whereby the upstream node removes a description of a mesh multicast tree branch from multicast routing information of the multicast group, wherein the first mesh access point is a node of the mesh multicast tree branch.

7. The method of claim 3, wherein the multicast group information comprises a list of addresses of multicast groups whose members are associated with the first mesh access point.

8. The method of claim 1, wherein the proxy update message is a Proxy Removal (PREM) message.

9. The method of claim 1, wherein the third mesh access point is an Intelligent Access Point (IAP).

10. The method of claim 1, wherein the proxy update message is sent from the third mesh access point in response to the third mesh access point processing a Binding Request (BREQ) message received from the second mesh access point for the first wireless node.

11. The method of claim 10, wherein the BREQ message comprises multicast group information for multicast members associated with the second mesh access point and the following proxy update message generated based on the BREQ also comprises the same multicast group member information.

12. The method of claim 1, wherein the multicast member join request is an Internet Group Management Protocol (IGMP) member join request.

13. The method of claim 1, wherein connections between the first mesh access point and the third mesh access point, and connections between the second mesh access point and the third mesh access point, comprise one or more of wireless connections or wired connections.

* * * * *